United States Patent
Omi et al.

[11] 3,904,286
[45] Sept. 9, 1975

[54] MICROFILM READER

[75] Inventors: Kokichi Omi; Shunzo Inoue, both of Tokyo, Japan

[73] Assignee: Canon Kabushiki Kaisha, Tokyo, Japan

[22] Filed: Apr. 9, 1974

[21] Appl. No.: 459,368

[30] Foreign Application Priority Data
Apr. 19, 1973  Japan.................. 48-44439

[52] U.S. Cl. ................ 353/71; 353/77; 353/79
[51] Int. Cl.² ................ G03B 21/10; G03B 21/28
[58] Field of Search ........... 353/71, 72, 73, 77, 78, 353/74, 119, 98, 99; 352/104

[56] References Cited
UNITED STATES PATENTS
3,807,847   4/1974   Okano ............................ 353/71

FOREIGN PATENTS OR APPLICATIONS
936,054   2/1948   France .................. 353/71
1,003,871  11/1951  France .................. 353/79
602,742    6/1948  United Kingdom .......... 353/71
271,989   11/1950  Switzerland ............. 353/79

*Primary Examiner*—Harry N. Haroian
*Attorney, Agent, or Firm*—Fitzpatrick, Cella, Harper & Scinto

[57] ABSTRACT

A microfilm reader comprising a screen mounted on the reader and a screen mounted externally of the reader whereby the viewing of the image projected on either of the screens may be selectively performed. A knob is provided to effect automatic switching of such viewing.

11 Claims, 3 Drawing Figures

MICROFILM READER

BACKGROUND OF THE INVENTION

1. Field of the Invention

This invention relates to a microfilm reader incorporating a reflection screen therein, and more particularly to a microfilm reader which is able to selectively perform viewing an image projected on a reflection screen and viewing an image projected on a large-size screen provided externally of the reader.

2. Description of the Prior Art

One type of microfilm reader that is conventionally used is so designed as to optically project an image recorded on a film, for viewing, on a screen mounted on a reader body. This type of reader is provided with a small-size screen so that it is suited when an individual or a small number of persons view the image. When a large number of persons desire to view the same image simultaneously, a large-size screen must be used, which causes the reader a large-size. For this reason, in a microfilm reader provided with a transmission screen, this transmission screen mounted frontwardly of the reader is detachably arranged, and when this reader is used by an individual or a small number of persons, an image is projected on the back of the screen whereby the light that transmits the screen may be viewed by viewers. On the other hand, when this reader is used by a large number of persons, the screen is removed and an image is projected on the reflection screen provided externally of the reader or on a white wall whereby the light reflected from the screen may be viewed. However, this method inhibits a proper reading because the image projected on the reflection screen externally provided will appear in a form of a reversed image relative to the image projected on the transmission screen. Accordingly, the viewer has to replace a film reversingly in order to properly project the image on the microfilm, and this makes the handling complex. Further, in order to eliminate such difficulties of handling, if a reflector mirror is inserted in a projection light path so that the light image reflected from the reflector mirror is projected on the exterior screen, a reversed image such as described above is not projected but in such case, an image projected will be upside down, thus forming a turned image relative to a proper image. Therefore, in either case, the film has to be displaced, which complicates the operation. Further, another conventional reader comprises a reflection screen which is encased in a casing of the reader, but this type of reader also has the disadvantages similar to those described above.

SUMMARY OF THE INVENTION

An object of this invention is to eliminate the disadvantages noted above with respect to prior art devices. The invention provides a simple construction and operation, whereby viewing of an image projected on a screen mounted on the reader and viewing of an image projected on a screen mounted externally of the reader may be selectively performed in answer to a need of use. That is, this invention provides a microfilm reader comprising a reflection screen and a reflector mirror encased in a casing, wherein if a small number of persons enjoy the viewing, the light reflected from the reflector mirror may be projected on a reflection screen, and if a large number of persons enjoy the simultaneous viewing, the light image may be projected on a rearward large-size screen or wall through an opening and closing portion located at a top part or rear part of the casing, such projections being selectively effected.

DESCRIPTION OF THE PREFERRED EMBODIMENTS

The microfilm reader of the present invention will be best understood upon perusal of the following description of certain specific embodiments with reference to the accompanying drawings.

Figure 1:
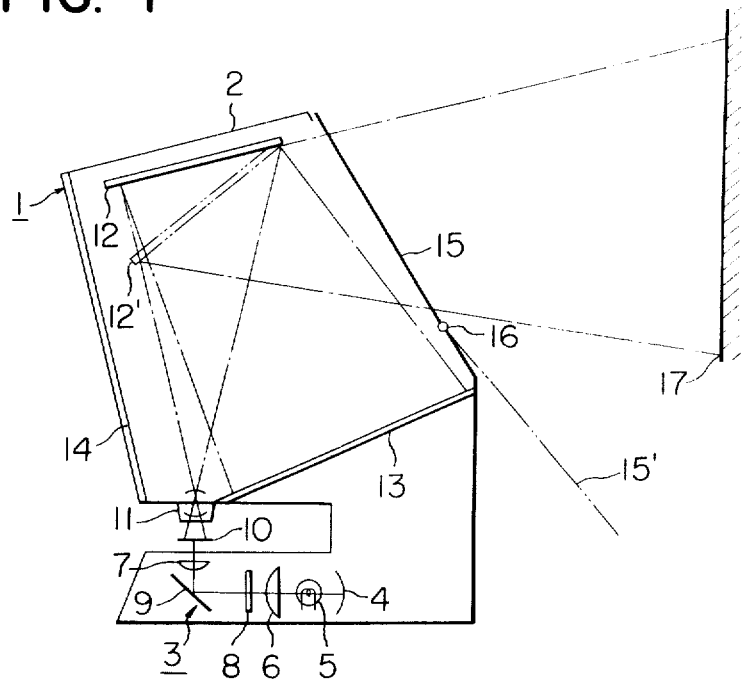
FIG. 1 schematically illustrates an embodiment of a microfilm reader in accordance with the present invention.

Referring now to FIG. 1, there is illustrated one embodiment of a microfilm reader according to the present invention, which includes a microfilm reader itself 1, a casing 2 of the microfilm reader, and a light source optical system 3 arranged at the bottom of the casing. This optical system 3 includes a light source lamp 5 incorporating a reflection concave mirror 4, condenser lenses 6 and 7, an insulated filter 8, and a reflection mirror 9. The microfilm reader further includes a microfilm 10 such as microfiche on which a microimage is recorded, a focussing lens system 11, a reflection mirror 12 rotatably arranged at the upper part within the casing 2 of the reader, a reflection screen 13 arranged in the casing 1 on the opposite side of the reflection mirror 12, a filter member 14 arranged at the open portion frontwardly of the casing so as to prevent the invasion of dusts and the like, a shield member openably disposed at the opening portion at the rear of the casing 1 and adapted to be opened and closed by pivoting on a shaft 16, and a large-size or white wall 17 arranged externally of the reader 1. An image recorded on a microfilm is illuminated by the light source optical system 3 and from there is amplified and projected on the reflection screen 13 through the focussing lens system 11 and reflection mirror 12. The viewer in front of the reader 1 can observe the light reflected from the screen 13 through the filter member 14 and read the image projected thereon. If viewing is entertained by a large number of persons using this reader, the shield member 15 at the rear of the casing is moved to a position as indicated by the two-dotted line 15' to open the back of the casing and the reflection mirror 12 within the casing is rotated from a position as indicated by the solid line to a position as indicated by the two-dotted line 12'. The image recorded on the microfilm 1 is reflected from the focussing lens system 11 and reflection mirror 12, and the light thus reflected is directed outward through the rearward opening portion and from there is amplified and projected on the exterior large-size screen 12. Accordingly, the image projected on the large-size screen 17 may be properly read similarly to the image projected on the reflection screen 13.

Figure 2:
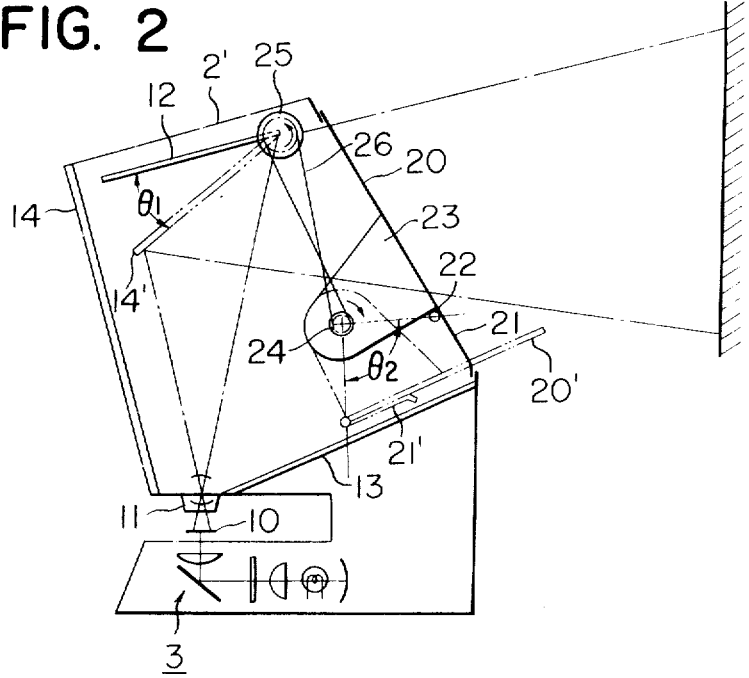
FIG. 2 schematically illustrates another mode of embodiment of the invention.
Figure 3:
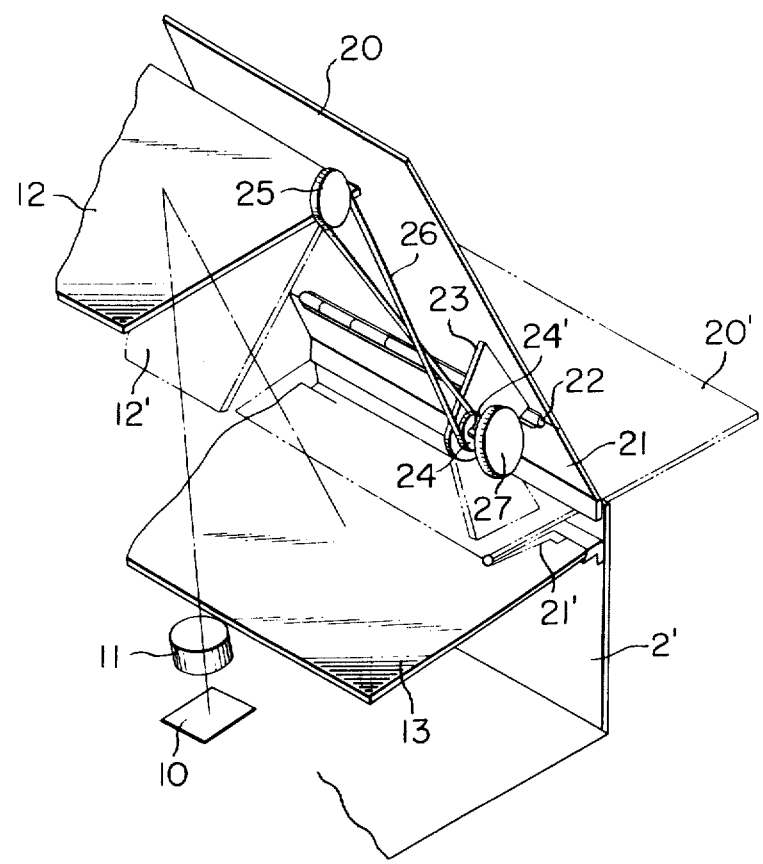
FIG. 3 is a perspective view illustrating a main portion shown in FIG. 2.

FIGS. 2 and 3 illustrate a modified form of embodiment according to the present invention wherein similar reference numbers in FIG. 1 refer to similar parts in FIGS. 2 and 3. Referring now to FIGS. 2 and 3, the opening portion at the rear of the casing 2 is closed by shield members 20 and 21 which are mounted to be folded by a hinge 22. A pulley 24 is fixed integral with an arm mounted on the shield member 20 perpendicularly thereto, and a pulley 25 is fixed on a rotary shaft of the reflection mirror in the casing 2. A belt 26 is passed over between the pulley 25 and the pulley 24. This belt 26 is passed over so as to cause these pulleys 24 and 25 to be rotated in the opposite directions from one another. A rotary shaft 24' (shown in FIG. 3) outwardly extends through the side wall of the casing, on the end of which is mounted a knob 27 (shown in FIG. 3). When this Knob 27 is rotated clockwise, the lever arm 23 integral with the pulley 24 rotates on the rotary shaft 24', and in line therewith the shield members 20 and 21 are moved to be placed in a state folded in positions indicated by the two-dotted lines 20' and 21'. On the other hand, the pulley 25 is rotated counterclockwise through the belt 26 in line with rotation of the pulley 24, and the reflection mirror 12 is likewise rotated to a position indicated by the two-dotted line 14'. It is presumed that $\theta_2$ is the angle of rotation obtained when the lever arm 23 is moved from the position as indicated by the solid line to the position as indicated the dotted line, and at such time the reflection mirror 12 is rotated from the position as indicated by the solid line to position as indicated by the two-dotted line, the angle of rotation thus obtained being represented by $\theta_1$. If the ratio of radius between the pulleys 24 and 25 is $$\frac{\text{Radius of pulley 24}}{\text{Radius of pulley 25}} = \frac{\theta_1}{\theta_2}$$

and when the pulley 24 is rotated, by the knob, by the angle $\theta_2$, the reflection mirror 12 is to be rotated by the angle $\theta_1$ in line therewith. In FIG. 2, when the reflection mirror 12 is placed in a position as indicated by the solid line, the viewer can observe the image projected on the reflection screen 13 through the filter member 14. Next, where viewed by a large number of persons with the use of the exterior screen 17, when the knob 27 is rotated by the angle $\theta_2$, the shield members 20 and 21 move to the positions as indicated by the two-dotted line 20' and 21', respectively, to open the back of the reader 1. On the other hand, in line with the rotation of knob 27 the reflection mirror 12 is rotated by the angle $\theta_1$ to the position as indicated by the dotted line 12' to direct the reflected light to the exterior screen 17 through the rearward opening portion, and the image projected is amplified and projected on the screen 17. When the knob 27 is returned to its original position after viewing with the use of the exterior screen has been completed, the back of the reader 1 is again shielded from the outside and the reflection mirror 12 is also returned to its original position.

Obviously, the reflection mirror adapted to open and close the top portion of the casing instead of opening and closing the rearward portion of the casing may be designed so that the right end of the reflection mirror is moved upward so as to project the light reflected from the reflection mirror on the exterior screen at the rear of the reader through the top opening.

From the foregoing, it will be appreciated that the present invention provides the selective performance of the viewing by an individual or a small number of people and the viewing by a large number of persons with the use of a single microfilm reader and further provides an automatic switching between them only with the operation of the knob. Further, the microfilm reader according to the present invention may be designed for the type which is small-size and compact, whereby the viewing through the small-size reflection screen and the viewing through the large-size screen provided externally of the reader may be performed by one unit of reader.

We claim:

1. In a film reader having an image projecting means and provided with a reflection screen and a reflection mirror within a casing comprising:
   first pivotable means for pivoting the reflection mirror provided at an upper portion of the casing;
   second pivotable means for opening and closing a rear wall of the casing which is facing an opening of the casing for observing the reflection screen;
   belt means interconnecting said first pivotable means and said second pivotable means; and
   operating means for driving said belt means;
   whereby a projected image is selectively projected, through the reflection mirror, onto said reflection screen or onto a screen provided outside the film reader through the opening at the rear wall of the casing.

2. A film reader according to claim 1, wherein said first and second pivotable means include pulleys respectively.

3. A film reader according to claim 2, wherein said pulleys have different diameters.

4. A film reader according to claim 1, wherein said rear wall is foldable.

5. A film reader according to claim 1, wherein said first and second pivotable means rotate in different ways with respect to each other, when said belt means is driven.

6. An image reader comprising:
   a reflection screen;
   a casing having walls for enclosing said reflection screen, an opening for permitting observation of an image projected on said screen, and an openable rear wall facing the opening;
   a reflection mirror pivotably mounted within said casing, said reflection mirror having first and second positions thereof;
   a first pulley for changing the position of said reflection mirror between said first and second positions;
   a second pulley for opening and closing the rear wall, said second pulley being disposed on the rear wall;
   belt means interconnecting said first pulley and said second pulley to rotate said pulleys;
   illuminating means for illuminating a film to be projected;
   lens means for projecting an image of the film with magnification; and
   operating means for driving and controlling said belt means to selectively project the image of the film onto said reflection screen through said reflection mirror placed at the first position thereof, or onto a screen provided outside of the casing through said reflection mirror placed at the second position thereof and through the opened rear wall.

7. An image reader according to claim 6, wherein said opening is provided with a filter.

8. An image reader according to claim 6, wherein said rear wall is foldable.

9. An image reader according to claim 6, wherein said first and second pulleys move in different ways with respect to each other, when said belt means is driven.

10. An image reader according to claim 6, wherein said pulleys have different diameters.

11. An image reader according to claim 6, wherein the angles of rotation of said first and second pulleys are different with respect to each other, when said belt means is driven.

* * * * *